(12) United States Patent
Bienmüller et al.

(10) Patent No.: US 9,163,140 B2
(45) Date of Patent: Oct. 20, 2015

(54) POLYESTER COMPOSITIONS

(75) Inventors: Matthias Bienmüller, Krefeld (DE); Ulrich Plutowski, Dormagen (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 13/993,708

(22) PCT Filed: Dec. 14, 2011

(86) PCT No.: PCT/EP2011/072807
§ 371 (c)(1),
(2), (4) Date: Dec. 16, 2013

(87) PCT Pub. No.: WO2012/080361
PCT Pub. Date: Jun. 21, 2012

(65) Prior Publication Data
US 2014/0088241 A1  Mar. 27, 2014

(30) Foreign Application Priority Data
Dec. 14, 2010  (EP) .................................... 10194965

(51) Int. Cl.
*C08K 3/22* (2006.01)
*C08K 7/14* (2006.01)
*C08L 67/03* (2006.01)
*C08K 3/40* (2006.01)
*B29C 45/00* (2006.01)

(52) U.S. Cl.
CPC ............. *C08L 67/03* (2013.01); *B29C 45/0005* (2013.01); *C08K 3/22* (2013.01); *C08K 7/14* (2013.01); *C08K 2003/2241* (2013.01); *C08K 2201/011* (2013.01)

(58) Field of Classification Search
CPC .... C08K 3/22; C08K 7/14; C08K 2003/2241; C08K 2201/011; C08K 3/40; B29C 45/0005; C08L 67/03
USPC .................................................. 524/494, 497
See application file for complete search history.

(56) References Cited

U.S. PATENT DOCUMENTS

| | | | |
|---|---|---|---|
| 3,692,744 A | 9/1972 | Rich et al. | |
| 4,035,958 A | 7/1977 | Nishio | |
| 4,122,061 A | 10/1978 | Holub et al. | |
| 4,176,224 A | 11/1979 | Bier et al. | |
| 4,436,860 A * | 3/1984 | Hepp | 524/394 |
| 4,806,593 A | 2/1989 | Kress et al. | |
| 4,859,740 A | 8/1989 | Damrath et al. | |
| 6,538,054 B1 | 3/2003 | Klatt et al. | |
| 7,134,592 B2 | 11/2006 | Ensslin et al. | |
| 8,192,645 B2 * | 6/2012 | Murouchi et al. | 252/299.01 |
| 2006/0142438 A1 * | 6/2006 | Ishii et al. | 524/100 |
| 2009/0130451 A1 * | 5/2009 | Farrell | 428/411.1 |
| 2011/0213077 A1 | 9/2011 | Bertucci et al. | |
| 2013/0158184 A1 | 6/2013 | Topoulos | |

FOREIGN PATENT DOCUMENTS

| | | | |
|---|---|---|---|
| DE | 2407776 A1 | | 9/1975 |
| DE | 4236122 A1 | | 4/1994 |
| JP | 55-027335 | * | 2/1980 |
| JP | 62044580 A | | 2/1987 |
| JP | 10087968 A2 | | 4/1998 |
| JP | 2000198912 A2 | | 7/2000 |
| JP | 2001011292 A2 | | 1/2001 |

OTHER PUBLICATIONS

Kawamura (Teijin) English Translation of JP55-027335, May 2014.*
Hanser, Carl, Plastic Additives Handbook, 5th Edition, Verlag, Munich, 2001.
International Search Report from co-pending Application PCT/EP2011/072807 dated Jan. 31, 2012, 2 pages.

* cited by examiner

*Primary Examiner* — Randy Gulakowski
*Assistant Examiner* — Christopher M Rodd

(57) ABSTRACT

The invention relates to compositions based on polyester, titanium dioxide, and glass fibers, to the use of said compositions for producing short-period-heat-resistant products and also to a process for producing short-period-heat-resistant polyester-based products, in particular polyester-based optoelectronic products.

16 Claims, No Drawings

POLYESTER COMPOSITIONS

The invention relates to compositions based on polyester, titanium dioxide, and glass fibers, to the use of said compositions for producing short-period-heat-resistant products and also to a process for producing short-period-heat-resistant polyester-based products, in particular polyester-based optoelectronic products.

Many electronic and electrical modules and components comprise temperature-sensitive electrical and/or electronic products, e.g. heat-sensitive integrated circuits, lithium batteries, oscillator crystals and optoelectronic products. In the course of the assembly of this type of module, a reliable process is necessary for connecting the electrical contacts provided on the products to conductor tracks of a circuit board and/or to electrical contacts of other products. Said assembly is often achieved with the aid of a soldering process in which soldered connections provided on the product are soldered to the circuit board. For each product here there is a safe range of soldering time and soldering temperature within which it is possible to produce good soldered connections. At the same time, excessive heating of the temperature-sensitive electrical and electronic products must be avoided, if lasting damage is to be avoided. The soldering of heat-sensitive products therefore involves the conflicting requirements of firstly ensuring that the soldering temperature provided in the region of the soldered connections is sufficiently high for the soldering process but secondly keeping the temperature in the temperature-sensitive regions of the products sufficiently low to avoid damage to the products.

In order to achieve a good soldering result, the products used for producing LEDs have to be exposed to elevated temperatures over prolonged periods during the soldering process. By way of example, therefore, in the wave soldering process the product inserted onto the circuit board is first slowly heated to about 10° C. The actual soldering process then takes place, typically at about 26° C. and taking at least 5 seconds, followed by the solidification phase, during which the product slowly cools. In WO 02/074028 A1, in order to provide efficient protection for optoelectronic products from the temperature increases that occur during this soldering process (which takes a number of minutes in total), the products are provided, during the soldering process, with a protective device that is removed once the soldering process has ended.

JP-A-55027335 discloses a composition comprising PET (polyethylene terephthalate) as polyester, titanium dioxide with particle size from 10 to 10 000 nm and glass fibers, for use in the sector of optoelectronic products. WO 2007/033129 A2 describes a heat-resistant composition for LED housings based on the polyester cyclohexanedimethanol terephthalate, and also titanium dioxide and glass fibers.

WO 2010/049531 A1 discloses what are known as power LEDs based on aromatic polyesters or on entirely aromatic polyesters, the intention here being to prevent the degradation of the thermoplastic material by heat or radiation. These power LEDs exhibit prolonged luminosity due to the use of said aromatic polyesters or entirely aromatic polyesters, in particular based on p-hydroxybenzoic acid, terephthalic acid, hydroquinone or 4,4'-bisphenol and optionally isophthalic acid. However, disadvantages of the polyesters of WO 2010/049531 A1 are the high processing temperatures in the melt, which are 355° C. and higher because of the high melting points of the polymers described, and also the high mold temperatures of 175° C. and higher.

It has been found that although the polyesters mentioned in the prior art may have adequate stability in terms of their short-period heat resistance or solder bath resistance they exhibit disadvantages in particular when processed in the melt. The disadvantages arise because the polyesters mentioned in the prior art have high melting points and therefore require very high processing temperatures above the melting point and require high mold temperatures. High processing temperatures and high mold temperatures require injection-molding machines having specific and expensive equipment in particular for temperature control and cooling of the molds. High processing temperatures also lead to increased wear of the injection-molding unit.

It is therefore the object of the present invention to provide compositions with optimized properties in respect of short-period heat resistance, reflectance, and high surface quality, together with low processing temperatures in the melt.

The provision of compositions which have adequately high short-period heat resistance (this being a precondition for obtaining good soldering results in subsequent processing steps) while at the same time requiring low processing temperatures in the melt (with resultant considerable improvement in the processing of the compositions), represents a particular technical challenge because the two properties are per se in conflict. The object also includes the requirement for optimized reflectance and surface quality properties and therefore represents an even greater challenge.

The object is achieved by, and the present invention provides, compositions comprising
a) from 5 to 50 parts by weight, preferably from 10 to 40 parts by weight, particularly preferably from 13 to 33 parts by weight, of glass fibers,
b) from 10 to 40 parts by weight, preferably from 13 to 33 parts by weight, particularly preferably from 18 to 28 parts by weight, of titanium dioxide with average particle size from 90 nm to 2000 nm, and
c) from 20 to 80 parts by weight, preferably from 30 to 70 parts by weight, particularly preferably from 40 to 60 parts by weight, of polyethylene terephthalate (PET).

In one preferred embodiment, the present invention provides compositions comprising
a) from 5 to 50 parts by weight, preferably from 10 to 40 parts by weight, particularly preferably from 13 to 33 parts by weight, of glass fibers,
b) from 10 to 40 parts by weight, preferably from 13 to 33 parts by weight, particularly preferably from 18 to 28 parts by weight, of titanium dioxide with average particle size from 90 nm to 2000 nm, and
c) from 20 to 80 parts by weight, preferably from 30 to 70 parts by weight, particularly preferably from 40 to 60 parts by weight, in particular from 40 to 50 parts by weight, of polyethylene terephthalate (PET), and
d) from 8 to 12 parts by weight of polybutylene terephthalate (PBT).

In one preferred embodiment, the compositions of the invention also comprise, in addition to a) to d),
e) from 0.01 to 15 parts by weight, preferably from 0.01 to 10 parts by weight, particularly preferably from 0.01 to 5 parts by weight, of additives which differ from the components mentioned under a) and b).

In one particularly preferred embodiment, the sum of all of the parts by weight is 100% and corresponds to the entire composition of the molding compositions of the invention.

The glass fibers to be used as component a) in the invention generally have a fiber diameter of from 7 to 18 μm, preferably from 9 to 15 m, and are added in the form of continuous-filament fibers or in the form of chopped or ground glass fibers. The fibers can have been equipped with a suitable size system and with a coupling agent or coupling agent system, preferably silane-based.

Familiar silane-based coupling agents for the pretreatment are silane compounds of the general formula (I)

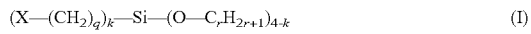  (I)

where the definitions of the substituents are as follows:
X: $NH_2$—, HO—,

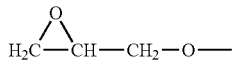

q: is an integer from 2 to 10, preferably from 3 to 4,
r: is an integer from 1 to 5, preferably from 1 to 2,
k: is an integer from 1 to 3, preferably 1.

Preferred coupling agents are silane compounds from the group of aminopropyltrimethoxysilane, aminobutyltrimethoxysilane, aminopropyltriethoxysilane, aminobutyltriethoxysilane, and also corresponding silanes which comprise a glycidyl group as substituent X.

The amounts generally used of the silane compounds for the surface treatment to modify the glass fibers are from 0.05 to 2% by weight, preferably from 0.25 to 1.5% by weight, and in particular from 0.5 to 1% by weight based on the glass fibers.

As a result of the processing to give the molding composition or to give the molding, the d97 or d50 value of the glass fibers in the molding composition or in the molding can be smaller than that of the glass fibers originally used. As a result of the processing to give the molding composition or to give the molding, the length distributions of the glass fibers can be shorter in the molding composition or in the molding than those originally used.

Titanium dioxide pigments that can be used for the titanium dioxide to be used as component b) in the invention are those for which the underlying material can have been produced by the sulfate process (SP) or chloride process (CP) and which have the anatase and/or rutile structure, preferably rutile structure. The underlying material need not have been stabilized, but specific stabilization is preferred: in the case of the underlying material from the CP, via Al doping at from 0.3 to 3.0% by weight (calculated as $Al_2O_3$) and an oxygen excess of at least 2% in the gas phase during the oxidation of the titanium tetrachloride to give titanium dioxide; in the case of the underlying material from the SP, via doping by way of example with Al, Sb, Nb or Zn. In order to obtain sufficiently high lightness of color, particular preference is given to "light" stabilization with Al, preferably, or in the event of relatively high Al doping levels, with antimony compensation. When titanium dioxide is used as white pigment in paints and coatings, plastics, etc. it is known that undesired photocatalytic reactions produced via UV absorption lead to decomposition of the pigmented material. Titanium dioxide pigments absorb light here in the near ultraviolet region, and electron-hole pairs are thus produced, and these produce highly reactive free radicals on the surface of the titanium dioxide. The resultant free radicals cause binder degradation in organic media. In the invention it is preferable that, in order to lower the photoactivity of the titanium dioxide, it is inorganically posttreated, particularly preferably with oxides of Si and/or Al and/or Zr, and/or via use of Sn compounds.

It is preferable that the surface of titanium dioxide pigment has a covering of amorphous precipitates of oxide hydrates of the compounds $SiO_2$ and/or $Al_2O_3$, and/or zirconium oxide.

The $Al_2O_3$ coating facilitates pigment dispersion in the polymer matrix, and the $SiO_2$ coating inhibits charge transfer at the surface of the pigment and thus prevents polymer degradation.

In the invention, the titanium dioxide is preferably provided with hydrophilic and/or hydrophobic organic coatings, in particular with siloxanes or polyalcohols. Titanium dioxide to be used in the invention has average particle size from 90 nm to 2000 nm, preferably from 200 urn to 800 nm.

Examples of products obtainable commercially are Kronos® 2230, Kronos® 2225 and Kronos® v1p7000 from Kronos, Dallas, USA.

The PET and PBT to be used as components c) and d) are reaction products of aromatic dicarboxylic acids or of their reactive derivatives, preferably dimethyl esters or anhydrides, and of aliphatic, cycloaliphatic or araliphatic diols, and mixtures of said reaction products.

They can be produced by known methods from terephthalic acid (or from its reaction derivatives) and from the respective aliphatic diols having 2 and, respectively, 4 carbon atoms (Kunststoff-Handbuch [Plastics Handbook], volume VIII, pp. 695 ff., Karl-Hanser-Verlag, Munich 1973). These are therefore not aromatic polyesters for the purposes of WO 2010/049531 A1.

Preferred polyethylene terephthalates (PET) and polybutylene terephthalates (PBT) comprise at least 80 mol %, preferably 90 mol %, based on the dicarboxylic acid, of terephthalic acid moieties, and at least 80 mol %, preferably at least 90 mol %, based on the diol component, of ethylene glycol moieties or 1,4-butanediol moieties.

The preferred polyethylene terephthalates and polybutylene terephthalates can comprise, alongside terephthalic acid moieties, up to 20 mol % of moieties of other aromatic dicarboxylic acids having from 8 to 14 carbon atoms or moieties of aliphatic dicarboxylic acids having from 4 to 12 carbon atoms, for example moieties of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, or cyclohexanedicarboxylic acid.

The preferred polyethylene terephthalates and polybutylene terephthalates can comprise, alongside ethylene moieties and, respectively, 1,4-butanediol glycol moieties, up to 20 mol % of other aliphatic diols having from 3 to 12 carbon atoms or of cycloaliphatic diols having from 6 to 21 carbon atoms, preferably moieties of 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3- or 1,6-pentane diol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl) propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-A 24 07 674 (=U.S. Pat. No. 4,035,958), DE-A 24 07 776, DE-A 27 15 932 (=U.S. Pat. No. 4,176,224)).

The PET and PBT materials to be used in the invention can be branched via incorporation of relatively small amounts of tri- or tetrahydric alcohols or tri- or tetrabasic carboxylic acids, such as those described by way of example in DE-A 19 00 270 (=U.S. Pat. No. 3,692,744). Preferred branching agents are trimesic acid, trimellitic acid, trimethylolethane, trimethylolpropane, and pentaerythritol.

The PET and PBT materials to be used in the invention preferably have an intrinsic viscosity of about 0.3 $cm^3/g$ to 1.5 $cm^3/g$, particularly preferably from 0.4 $cm^3/g$ to 1.3 $cm^3/g$, particularly preferably from 0.5 cm³/g to 1.0 cm³/g, measured in each case in phenol/o-dichlorobenzene (1:1 parts by weight) at 25° C.

The polyesters of component c) PET and of component d) PBT can also optionally be used in a mixture with other polyesters and/or other polymers.

The compositions of the invention can also comprise additives as component e).

Usual additives of component e) are preferably stabilizers, in particular UV stabilizers, heat stabilizers, gamma-radiation stabilizers, antistatic agents, flow aids, flame retardants, mold-release agents, elastomer modifiers, fire-protection additives, emulsifiers, nucleating agents, plasticizers, lubricants, dyes, and pigments. The additives mentioned and other suitable additives are described by way of example in Gächter, Müller, Kunststoff-Additive [Plastics additives], 3rd edition, Hanser-Verlag, Munich, Vienna, 1989, and in Plastics Additives Handbook, 5th edition, Hanser-Verlag, Munich, 2001. The additives can be used alone or in a mixture or in the form of masterbatches.

Stabilizers used are preferably sterically hindered phenols, hydroquinones, aromatic secondary amines such as diphenylamines, substituted resorcinols, salicylates, benzotriazoles, and benzophenones, and also variously substituted members of these groups, and mixtures of these.

Dyes or pigments used, independently of the titanium dioxide of component b), are other dyes and pigments which in the case of an optoelectronic product have the aim of rendering the light to be emitted therefrom colored, or of using an optical brightener to improve the light that is to be emitted.

Nucleating agents used are preferably sodium phenylphosphinate or calcium phenylphosphinate, aluminum oxide, silicon dioxide or else preferably talc powder.

Lubricants and mold-release agents used are preferably ester waxes, pentaerythritol tetrastearate (PETS), long-chain fatty acids, in particular stearic acid or behenic acid, salts of these, in particular Ca stearate or Zn stearate, or else amide derivatives, in particular ethylenebisstearylamide, or montan waxes, in particular mixtures of straight-chain saturated carboxylic acids having chain lengths of from 28 to 32 carbon atoms, or else low molecular weight polyethylene waxes or low-molecular weight polypropylene waxes.

Plasticizers used are preferably dioctyl phthalate, dibenzyl phthalate, butyl benzyl phthalate, hydrocarbon oils, or N-(n-butyl)benzenesulfonamide.

Additives to be used as elastomer modifiers are preferably one or more graft polymers E of E.1 from 5 to 95% by weight, preferably from 30 to 90% by weight, of at least one vinyl monomer on E.2 from 95 to 5% by weight, preferably from 70 to 10% by weight, of one or more graft bases with glass transition temperatures<10° C., preferably <0° C., particularly preferably <−20° C.

The median particle size ($d_{50}$ value) of the graft base E.2 is generally from 0.05 to 10 μm, preferably from 0.1 to 5 μm, particularly preferably from 0.2 to 1 μm.

Monomers E.1 are preferably mixtures of

E.1.1 from 50 to 99% by weight of vinylaromatics and/or ring-substituted vinylaromatics (e.g. styrene, α-methyl styrene, p-methyl styrene, p-chlorostyrene) and/or ($C_1$-$C_8$)-alkyl methacrylates (e.g. methyl methacrylate, ethyl methacrylate) and E.1.2 from 1 to 50% by weight of vinyl cyanides (unsaturated nitriles, such as acrylonitrile and methacrylonitrile) and/or ($C_1$-$C_8$)-alkyl(meth)acrylate (e.g. methyl methacrylate, n-butyl acrylate, tert-butyl acrylate) and/or derivatives (such as anhydrides and imides) of unsaturated carboxylic acids (for example maleic anhydride and N-phenylmaleimide).

Preferred monomers E.1.1 are those selected from at least one of the monomers styrene, α-methylstyrene and methyl methacrylate, and preferred monomers E.1.2 are those selected from at least one of the monomers acrylonitrile, maleic anhydride, and methyl methacrylate.

Particularly preferred monomers are E.1.1 styrene and E.1.2 acrylonitrile.

Examples of graft bases E.2 suitable for the graft polymers to be used in the elastomer modifiers are diene rubbers, EP(D)M rubbers, i.e. rubbers based on ethylene/propylene and if appropriate on diene, and also acrylate rubbers, polyurethane rubbers, silicone rubbers, chloroprene rubbers and ethylene/vinyl acetate rubbers.

Preferred graft bases E.2 are diene rubbers (e.g. those based on butadiene, isoprene, etc.) or are a mixture of diene rubbers, or are copolymers of diene rubbers or of a mixture of these with other copolymerizable monomers (e.g. in accordance with E.1.1 and E.1,2) with the proviso that the glass transition temperature of component E.2 is <10° C., preferably <0° C., particularly preferably <−10° C.

Pure polybutadiene rubber is particularly preferred as graft base E.2.

Particularly preferred polymers E are ABS polymers (emulsion ABS, bulk ABS and suspension ABS), examples being those described in DE-A 2 035 390 (=U.S. Pat. No. 3,644,574) or in DE-A 2 248 242 (=GB-A 1 409 275) or in Ullmann, Enzyklopädie der Technischen Chemie [Encyclopedia of Industrial Chemistry], vol. 19 (1980), pp. 280 ff. The gel content of the graft base E.2 is at least 30% by weight, preferably at least 40% by weight (measured in toluene). ABS means acrylonitrile-butadiene-styrene copolymer with CAS number 9003-56-9, and is a synthetic terpolymer of the following three different types of monomer: acrylonitrile, 1,3-butadiene and styrene. It is an amorphous thermoplastic. The quantitative ratios here can vary from 15 to 35% of acrylonitrile, from 5 to 30% of butadiene and from 40 to 60% of styrene.

The elastomer modifiers or graft copolymers E are produced via free-radical polymerization, e.g. via emulsion, suspension, solution or bulk polymerization, preferably via emulsion or bulk polymerization.

Other particularly suitable graft rubbers are ABS polymers which are produced via redox initiation using an initiator system composed of organic hydroperoxide and ascorbic acid according to U.S. Pat. No. 4,937,285.

Because it is known that the graft monomers are not necessarily entirely grafted onto the graft base during the grafting reaction, products which are obtained via (co)polymerization of the graft monomers in the presence of the graft base and are produced concomitantly during the work-up are also graft polymers E according to the invention.

Suitable acrylate rubbers are those based on graft bases E.2 which are preferably polymers composed of alkyl acrylates, if appropriate with up to 40% by weight, based on E.2, of other polymerizable, ethylenically unsaturated monomers. Among the preferred polymerizable acrylic esters are $C_1$-$C_8$-alkyl esters, preferably methyl, ethyl, butyl, n-octyl and 2-ethylhexyl esters; haloalkyl esters, preferably halo-$C_1$-$C_8$-alkyl esters, particularly preferably chloroethyl acrylate, and also mixtures of the said monomers.

For crosslinking, monomers having more than one polymerizable double bond can be copolymerized. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 40H groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinked monomers is preferably from 0.02 to 5% by weight, in particular from 0.05 to 2% by weight, based on the graft base E.2.

In the case of cyclic crosslinking monomers having at least 3 ethylenically unsaturated groups, it is advantageous to restrict the amount to below 1% by weight of the graft base E.2.

Examples of preferred "other" polymerizable, ethylenically unsaturated monomers which can serve alongside the acrylic esters, if appropriate, for production of the graft base E.2 are acrylonitrile, styrene, α-methylstyrene, acrylamides, vinyl $C_1$-$C_6$-alkyl ethers, methyl methacrylate, butadiene. Acrylate rubbers preferred as graft base E.2 are emulsion polymers whose gel content is at least 60% by weight.

Other suitable graft bases according to E.2 are silicone rubbers having sites active for grafting purposes, as described in DE-A 3 704 657 (=U.S. Pat. No. 4,859,740), DE-A 3 704 655 U.S. Pat. No. 4,861,831), DE-A 3 631 540 (=U.S. Pat. No. 4,806,593) and DE-A 3 631 539 (=U.S. Pat. No. 4,812, 515).

Additives used as flame retardants comprise commercially available organic halogen compounds with synergists, or commercially available organic nitrogen compounds, or organic/inorganic phosphorus compounds, individually or in a mixture. It is also possible to use mineral flame retardant additives such as magnesium hydroxide or Ca Mg carbonate hydrates (e.g. DE-A 4 236 122 (=CA 2 109 024 A1)). Halogen-containing, in particular brominated and chlorinated compounds that may be preferred are ethylene-1,2-bistetrabromophthalimide, epoxidized tetrabromobisphenol A resin, tetrabromobisphenol A oligocarbonate, tetrachlorobisphenol A oligocarbonate, pentabromopolyacrylate, and brominated polystyrene. Suitable organic phosphorus compounds are the phosphorus compounds of WO-A 98/17720 (=U.S. Pat. No. 6,538,024), preferably triphenyl phosphate (TPP), resorcinol bis(diphenyl phosphate) inclusive of oligomers (RDP) and also bisphenol A bisdiphenyl phosphate inclusive of oligomers (BDP), melamine phosphate, melamine pyrophosphate, melamine polyphosphate, and mixtures of these. Particular nitrogen compounds used are melamine and melamine cyanurate. Suitable synergists are preferably antimony compounds, in particular antimony trioxide and antimony pentoxide, zinc compounds, tin compounds, e.g. tin stannate and borates. It is also possible to add, to the flame retardant, what are known as carbonizers and tetrafluoroethylene polymers.

Independently of component a), additional filler and/or additional reinforcing material can be present as additives in the compositions of the invention.

However, preference is also given to use of a mixture of two or more different fillers and/or reinforcing materials, in particular based on talc, mica, silicate, quartz, titanium dioxide, wollastonite, kaolin, amorphous silicas, magnesium carbonate, chalk, feldspar, barium sulfate, glass beads and/or fibrous fillers and/or reinforcing materials based on carbon fibers. It is preferable to use mineral particulate fillers based on talc, mica, silicate, quartz, titanium dioxide, wollastonite, kaolin, amorphous silicas, magnesium carbonate, chalk, feldspar, or barium sulfate. It is particularly preferable in the invention to use mineral particulate fillers based on talc, wollastonite or kaolin.

Particular preference is moreover given to use of acicular mineral fillers as additive. In the invention, the expression acicular mineral fillers means a mineral filler with pronounced acicular character. Acicular wollastonites may be mentioned as an example. The length:diameter ratio of the mineral is preferably from 2:1 to 35:1, particularly preferably from 3:1 to 19:1, most preferably from 4:1 to 12:1. The average particle size of the acicular minerals of the invention is preferably smaller than 20 µm, particularly preferably smaller than 15 µm, with particular preference smaller than 10 µm, determined with a CILAS GRANULOMETER.

As already described above, the filler and/or reinforcing material in one preferred embodiment can have been surface-modified, particularly preferably with a coupling agent or coupling agent system, particularly preferably silane-based. However, the pretreatment is not essential.

The amounts used of the silane compounds for the surface coating to modify the fillers to be used as additive are generally from 0.05 to 2% by weight, preferably from 0.25 to 1.5% by weight and in particular from 0.5 to 1% by weight based on the mineral filler.

As a result of the processing to give the molding composition or to give the molding, the d97 or d50 value of the particulate fillers in the molding composition or in the molding can be smaller than that of the fillers originally used.

However, the present invention also provides the use of the compositions of the invention for producing short-period-heat-resistant products, preferably electrical and electronic modules and components, with particular preference, opto-electronic products.

However, the present invention also provides a process for producing products, preferably short-period-heat-resistant products for the electrical or electronics industry, particularly preferably electronic or electrical modules and components, where the matrix material is obtained via injection molding or extrusion, preferably via injection molding.

However, the present invention also provides a process for improving the short-period heat resistance of polyester-based products, characterized in that glassfiber-reinforced compositions based on a mixture of polybutylene terephthalate and polyethylene terephthalate are processed with titanium dioxide with average particle size from 90 nm to 2000 nm, by injection molding or by extrusion.

The processes for injection molding, and also for extrusion, of thermoplastic molding compositions are known.

Processes of the invention for producing products via extrusion or injection molding operate at melt temperatures in the range from 230 to 330° C., preferably from 250 to 300° C., and also optionally at pressures of at most 2500 bar, preferably at pressures of at most 2000 bar, particularly preferably at pressures of at most 1500 bar, and very particularly preferably at pressures of at most 750 bar.

In the sequential coextrusion process, two different materials are discharged in alternating succession. This produces a preform with material constitution that differs in sections in the direction of extrusion. It is possible to equip particular sections of an item with specifically required properties via appropriate selection of material, for example for items with soft ends and hard central portion or with integrated soft folding bellows regions (Thielen, Hartwig, Gust, "Blasformen von Kunststoffhohlkorpern" [Blow molding of plastics], Carl Hanser Verlag, Munich 2006, pages 127-129).

A feature of the injection molding process is that the raw material, preferably in pellet form, is melted (plastified) in a heated cylindrical cavity and is injected in the form of injection melt under pressure within a temperature-controlled cavity. Once the melt has cooled (solidified), the injection molding is demolded.

The various stages are
1. plastification/melting
2. injection phase (charging procedure)
3. hold-pressure phase (to take account of thermal contraction during crystallization) and
4. demolding An injection molding machine is composed of a clamping unit, the injection unit, the drive and the control system. The clamping unit has fixed and movable platens for the mold, an end platen, and also tie bars and drive for the movable mold platen. (Toggle assembly or hydraulic clamping unit.)

An injection unit encompasses the electrically heatable cylinder, the screwdrive (motor, gearbox) and the hydraulic system for displacing the screw and injection unit. The function of the injection unit consists in melting, metering and injecting the powder or the pellets and applying hold pressure thereto (to take account of contraction). The problem of reverse flow of the melt within the screw (leakage flow) is solved via non-return valves.

Within the injection mold, the inflowing melt is then separated and cooled, and the required component is thus manufactured. Two mold halves are always needed for this process. Various functional systems within the injection molding process are as follows:
runner system
shaping inserts
venting
machine mounting and uptake of force
demolding system and transmission of motion
temperature control.

In contrast to the injection molding process, the extrusion process uses a continuously shaped strand of plastic, in this case a polyamide, in the extruder, where the extruder is a machine for producing thermoplastic moldings. Various types of equipment are
single-screw extruders and twin-screw extruders and the respective subgroups
conventional single-screw extruders, conveying single-screw extruders,
contrarotating twin-screw extruders and corotating twin-screw extruders.

Extrusion plants are composed of extruder, die, downstream equipment, and extrusion blow molds. Extrusion plants for producing profiles are composed of: extruder, profile die, calibrator, cooling section, caterpillar and roller, separation device and tilting chute.

The present invention therefore also provides products, in particular short-period-dimensionally-stable products, obtainable via extrusion, profile extrusion, or injection molding of the compositions of the invention.

However, the present invention also provides a process for producing short-period-heat-resistant products, characterized in that glassfiber-reinforced compositions based on a mixture of polybutylene terephthalate and polyethylene terephthalate are processed with titanium dioxide with average particle size from 90 nm to 2000 nm, by injection molding or by means of extrusion.

The present invention preferably provides a process for producing short-period-heat-resistant products, characterized in that mixtures are processed which comprise
a) from 5 to 50 parts by weight of glass fibers,
b) from 10 to 40 parts by weight of titanium dioxide with average particle size from 90 nm to 2000 nm, and
c) from 40 to 50 parts by weight of polyethylene terephthalate (PET), and
d) from 8 to 12 parts by weight of polybutylene terephthalate.

Surprisingly, the products obtainable via the processes mentioned exhibit excellent short-period heat resistance/solder-belt resistance, and exhibit optimized properties in reflection at 450 nm, and little loss of this property on aging for a prolonged period, and optimized processability by virtue of adequate melt stability, with low melting points in the range from 250 to 275° C., in contrast to products that are obtained with the compositions of the prior art.

However, the present invention also provides the use of the compositions of the invention for raising the short-period heat resistance of products, in particular optoelectronic products.

The products produced by the method of the invention therefore have excellent suitability for electrical or electronic products, preferably optoelectronic products, in particular LEDs or OLEDs. A light-emitting diode (LED) is an electronic semiconductor component. If a current flows through the diode in the conducting direction, it emits light, infrared radiation (if it is an infrared light-emitting diode), or else ultraviolet radiation, with a wavelength that depends on the semiconductor material and on the doping. An organic light-emitting diode (OLED) is a thin-film luminous component made of organic semiconductor materials and differing from the inorganic light-emitting diodes (LED) in that current density and luminance are smaller and no monocrystalline materials are required. In contrast to conventional (inorganic) light-emitting diodes, organic light-emitting diodes can therefore be produced at lower cost, but they currently have shorter life time than conventional light-emitting diodes.

For clarification, it should be noted that the scope of the invention comprises any desired combination of any of the definitions and parameters mentioned above in general terms or in preferred ranges.

EXAMPLES

The compositions described in the invention are produced by mixing the individual components in the melt at temperatures of from 260 to 290° C. in a twin-screw extruder (ZSK 26 Mega Compounder from Coperion Werner & Pfleiderer (Stuttgart, Germany), discharged in the form of strand, cooled until pelletizable, and pelletized. The pellets are dried for about 2 h in a vacuum drying oven at 120° C. prior to further steps.

The test specimens (color sample plaques measuring 60×40×4 mm) for the tests listed in table 1 were injection-molded in a commercially available injection molding machine at a melt temperature of from 260 to 270° C. and at a mold temperature of from 80 to 120° C.:

Test to determine short-period heat resistance: in this test, a cylindrical soldering-head tip of diameter 1 mm is heated from 25° C. to 360° C. at a rate of 20° C./min. This soldering-head tip is in contact with the 60×40×4 mm test specimen, the weight applied being 1.0 kg. The temperature at which the penetration of the soldering-head tip into the test specimen is 1.5 mm is termed the penetration temperature. In the range from 350° C. to 360° C., useful evaluation during the measurement process becomes impossible by virtue of the tem perature gradients described, and the maximum evaluatable temperature obtained here is therefore 350° C. Everything above this is indicated by >350° C.

tetrastearate (PETS)), heat stabilizers (e.g. those based on phenyl phosphites) and nucleating agents (e.g. talc powder [CAS No. 14807-96-6]).

|  | Comp. 1 | Comp. 2 | Comp. 3 | Comp. 4 | Comp. 5 | Comp. 6 | Comp. 7 | IE 1 | IE 2 | IE 3 |
|---|---|---|---|---|---|---|---|---|---|---|
| Formulations |  |  |  |  |  |  |  |  |  |  |
| PBT | 78.5 | 73.5 | 7 | 58.5 | 0 | 0 | 0 | 10 | 10 | 10 |
| PET | 0 | 0 | 65 | 0 | 48.5 | 58.5 | 53.5 | 48.5 | 48.5 | 43.5 |
| TiO$_2$ | 0 | 25 | 25 | 20 | 20 | 20 | 20 | 20 | 25 | 20 |
| GF | 20 | 0 | 0 | 20 | 30 | 20 | 25 | 20 | 15 | 25 |
| Other materials | 1.5 | 1.5 | 3 | 1.5 | 1.5 | 1.5 | 1.5 | 1.5 | 1.5 | 1.5 |
| Test results |  |  |  |  |  |  |  |  |  |  |
| Reflectance at 450 nm [%] | 69 | 91 | 92 | 87 | 89 | 90 | 90 | 91 | 90 | 89 |
| Short-period heat resistance [Penetration temperature in ° C.] | 252 | 237 | 250 | 297 | >350 | >350 | >350 | 324 | 332 | >350 |
| Surface quality | + | + | + | o | o | o | o | + | + | + |
| Processability and ease of demolding | + | + | o | + | o | o | o | + | + | + |
| Reflectance loss after hot-air aging [%] | 14.7% | 0.8% | 2.2% | 4.5% | 2.9% | 2.0% | 2.8% | 3.2% | 2.7% | — |

From the table it can clearly be seen that the compositions of the invention exhibit not only high reflectance values, good processing conditions and demolding conditions, good surface quality and low reflectance loss after hot-air aging, but also short-term heat resistance of more than 300° C., together with low processing temperatures in the melt (260 to 270° C.).

Surface: the surface of test specimens measuring 60 mm×40 mm×4 mm was assessed and visually classified. The decisive assessment criteria were gloss, smoothness, color, and uniformity of surface structure. + means a better result than o.

Reflectance: the value determined for reflectance is the gloss value at 450 nm, in accordance with DIN 5033-4 in Minolta (CM2600D) color-measurement equipment under D65 light, on test specimens measuring 60 mm×40 mm×4 mm.

Reflectance loss after hot-air aging: for hot-air aging, the test specimens measuring 60 mm×40 mm×4 mm are aged in a commercially available hot-air oven at 140° C. for 14 days. After the aging process, the test specimens are removed from the oven, and reflectance is measured as described above after cooling to room temperature, and is calculated as a percentage of the corresponding reflectance value prior to aging.

Processability and ease of demolding: the processability and ease of demolding of the polyesters used in the invention can be derived from two properties, the injection pressure during the injection molding procedure, and the ease of demolding. The better the flowability of the molding composition, the lower the injection pressure required during the injection molding procedure and the better the processability. For ease of demolding, rapid crystallization is advantageous, permitting ejection of the product from the mold after minimum delay and without deformation. + means a better result than o.

PBT: polybutylene terephthalate (Pocan® B 1300, commercially available product from Lanxess Deutschland GmbH, Leverkusen, Germany) with intrinsic viscosity about 0.93 cm$^3$/g (measured in phenol:1,2-dichlorobenzene=1:1 at 25° C.)

PET: polyethylene terephthalate (PET V004 polyester chips, from Invista, Wichita, USA)

GF: glass fiber of diameter 10 μM sized with silane-containing compounds (CS 7967, commercially available product from Lanxess N.V., Antwerp, Belgium)

TiO$_2$: inorganic titanium dioxide commonly used in polyesters (e.g. Kronos® 2230 from Kronos, Dallas, USA)

Other materials: other additives commonly used in polyesters, for example mold-release agents (e.g. pentaerythritol

What is claimed is:

1. A heat-resistant polyester composition comprising:
   a) from 5 to 50 parts by weight of glass fibers
   b) from 10 to 40 parts by weight of titanium dioxide having an average particle size from 90 nm to 2000 nm, and a surface coating of amorphous precipitates of oxide hydrates of the compounds SiO$_2$ and/or Al$_2$O$_3$ and/or zirconium oxide,
   c) from 40 to 50 parts by weight of polyethylene terephthalate (PET),
   d) from 8 to 12 parts by weight of polybutylene terephthalate, and
   e) from 0.01 to 5 parts by weight of additional additives differing from components a) and b),
   with the proviso that the sum of all parts by weight correspond to 100% of the entire composition.

2. The composition as claimed in claim 1, wherein:
   the glass fibers have a fiber diameter of from 7 to 18 μm;
   the glass fibers comprise at least one of: continuous-filament fibers, chopped glass fibers, or ground glass fibers; and
   the glass fibers are pretreated with:
   a suitable size system; and
   a coupling agent or coupling agent system.

3. The composition as claimed in claim 1, wherein the coupling agent or system is silane-based.

4. The composition as claimed in claim 3, wherein the silane-based coupling agents for the pretreatment are silane compounds of the general formula (I)

$$(X-(CH_2)_q)_k-Si-(O-C_rH_{2r+1})_{4-k} \quad (I)$$

wherein:
X: NH$_2$—, HO—, or

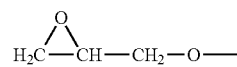

q: is an integer from 2 to 10,
r: is an integer from 1 to 5, and
k: is an integer from 1 to 3.

5. The composition according to claim 4, wherein:
the glass fibers comprise from 0.05 wt % to 2 wt % of the silane-based coupling agents, and
the silane-based coupling agents are selected from the group consisting of aminopropyltrimethoxysilane, aminobutyltrimethoxysilane, aminopropyitriethoxysilane, aminobutyltrlethoxysilane, and also corresponding silanes which comprise a glycidyl group as substituent X.

6. A composition according to claim 5, wherein the glass fibers prior to processing have a d97 and a d50 value, and after processing of the composition, the d97 or d50 value of the glass fibers in the composition is less than the d97 or d50 value of the original glass fibers.

7. The composition according to claim 1, wherein the titanium dioxide comprises titanium dioxide pigments produced by a process comprising one of a sulfate process (SP) or a chloride process (CP), and which titanium dioxide pigments have an anatase and/or a rutile structure.

8. The composition according to claim 7, wherein in the chloride process, material from the CP is doped at from 0.3 to 3.0% by weight (calculated as $Al_2O_3$) with Al and an oxygen excess of at least 2% in the gas phase during the oxidation of the titanium tetrachloride to give the titanium dioxide.

9. The composition according to claim 7, wherein in the sulfate process, material from the SP is doped with Al, Sb, Nb or Zn.

10. The composition according to claim 7, wherein the titanium dioxide comprises an hydrophilic and/or hydrophobic organic coating of at least one of siloxanes or polyalcohols.

11. A product obtained via extrusion or injection molding of the composition as A claimed in claim 1.

12. The product as claimed in claim 11, wherein the product is a product intended for the electrical or electronics industry and have a short-period heat resistance.

13. A method for producing products for the electrical or electronics industry, the method comprising producing the products from the composition as claimed in claim 1.

14. The method as claimed in claim 13, wherein the products have an increased short-period heat resistance resulting from use of the composition.

15. The method as claimed in claim 14, wherein the products comprise optoelectronic products.

16. A process for producing short-period-heat-resistant products, the process comprising: processing a mixture of glass fibers, polybutylene terephthalate, polyethylene terephthalate, and titanium dioxide by injection molding or by extrusion, wherein said mixture is the composition of claim 1.

* * * * *